US006859173B2

(12) United States Patent
Spilker, Jr. et al.

(10) Patent No.: US 6,859,173 B2
(45) Date of Patent: Feb. 22, 2005

(54) POSITION LOCATION USING BROADCAST TELEVISION SIGNALS AND MOBILE TELEPHONE SIGNALS

(75) Inventors: James J. Spilker, Jr., Woodside, CA (US); Jimmy K. Omura, San Francisco, CA (US); Matthew Rabinowitz, Portola Valley, CA (US)

(73) Assignee: The Rosum Corporation, Redwood City, CA (US)

( * ) Notice: Subject to any disclaimer, the term of this patent is extended or adjusted under 35 U.S.C. 154(b) by 0 days.

(21) Appl. No.: 10/747,851

(22) Filed: Dec. 29, 2003

(65) Prior Publication Data

US 2004/0207556 A1 Oct. 21, 2004

Related U.S. Application Data

(63) Continuation-in-part of application No. 10/232,142, filed on Aug. 29, 2002, now Pat. No. 6,717,547, which is a continuation-in-part of application No. 09/887,158, filed on Jun. 21, 2001, now abandoned, and a continuation-in-part of application No. 09/932,010, filed on Aug. 17, 2001, and a continuation-in-part of application No. 10/054,302, filed on Jan. 22, 2002, now Pat. No. 6,559,800, and a continuation-in-part of application No. 10/159,831, filed on May 31, 2002, now Pat. No. 6,522,297, and a continuation-in-part of application No. 10/054,262, filed on Jan. 22, 2002, now abandoned.
(60) Provisional application No. 60/315,983, filed on Aug. 29, 2001, provisional application No. 60/329,592, filed on Oct. 15, 2001, provisional application No. 60/361,762, filed on Mar. 4, 2002, and provisional application No. 60/378,819, filed on May 7, 2002.

(51) Int. Cl.$^7$ .................................................. G01S 3/02
(52) U.S. Cl. ........................................ 342/464; 342/463
(58) Field of Search ........................ 342/357.01, 357.06, 342/453, 457, 463, 464; 455/456.1, 456.6, 457

(56) References Cited

U.S. PATENT DOCUMENTS

| 4,555,707 A | 11/1985 | Connelly |
| 4,652,884 A | 3/1987 | Starker |

(List continued on next page.)

FOREIGN PATENT DOCUMENTS

| GB | 2 222 922 A | 3/1990 |
| GB | 2 254 508 A | 10/1992 |

OTHER PUBLICATIONS

Parkinson, B.W., et al., "Autonomous GPS Integrity Monitoring Using the Pseudorange Residual," *Journal of the Institute of Navigation* (1988), vol. 35, No. 2, pp. 255–274.

(List continued on next page.)

*Primary Examiner*—Dao Phan
(74) *Attorney, Agent, or Firm*—Richard A. Dunning, Jr.

(57) ABSTRACT

A method, apparatus, and computer-readable media for determining the position of a user terminal comprises receiving at the user terminal a broadcast television signal from a television signal transmitter; determining a first pseudo-range between the user terminal and the television signal transmitter based on a known component of the broadcast television signal; receiving at the user terminal a mobile telephone signal from a mobile telephone base station; determining a second pseudo-range between the user terminal and the mobile telephone base station based on a known component of the mobile telephone signal; and determining a position of the user terminal based on the first and second pseudo-ranges, a location of the television signal transmitter, and a location of the mobile telephone base station; wherein the mobile telephone signal is selected from the group consisting of a EDGE (Enhanced Data Rates for Global System for Mobile Communications (GSM) Evolution) signal; a Code-Division Multiple Access 2000 (cdma2000) signal; and a Wideband Code-Division Multiple Access (WCDMA) signal.

12 Claims, 8 Drawing Sheets

U.S. PATENT DOCUMENTS

| | | | |
|---|---|---|---|
| 4,894,662 | A | 1/1990 | Counselman |
| 5,045,861 | A | 9/1991 | Duffett-Smith |
| 5,157,686 | A | 10/1992 | Omura et al. |
| 5,166,952 | A | 11/1992 | Omura et al. |
| 5,323,322 | A | 6/1994 | Mueller et al. |
| 5,398,034 | A | 3/1995 | Spilker, Jr. |
| 5,481,316 | A | 1/1996 | Patel |
| 5,504,492 | A | 4/1996 | Class et al. |
| 5,510,801 | A | 4/1996 | Engelbrecht et al. |
| 5,593,311 | A | 1/1997 | Lybrand |
| 5,604,765 | A * | 2/1997 | Bruno et al. ............... 375/141 |
| 5,774,829 | A | 6/1998 | Cisneros et al. |
| 5,920,284 | A | 7/1999 | Victor |
| 5,952,958 | A | 9/1999 | Speasl et al. |
| 6,078,284 | A | 6/2000 | Levanon |
| 6,094,168 | A | 7/2000 | Duffett-Smith et al. |
| 6,107,959 | A | 8/2000 | Levanon |
| 6,131,067 | A | 10/2000 | Girerd et al. |
| 6,137,441 | A | 10/2000 | Dai et al. |
| 6,317,500 | B1 | 11/2001 | Murphy |
| 6,373,432 | B1 | 4/2002 | Rabinowitz et al. |
| 6,374,177 | B1 | 4/2002 | Lee et al. |
| 6,433,740 | B1 | 8/2002 | Gilhousen |
| 6,590,529 | B2 * | 7/2003 | Schwoegler ........... 342/357.13 |
| 2002/0008662 | A1 | 1/2002 | Dooley et al. |
| 2003/0122711 | A1 | 7/2003 | Panasik et al. |

OTHER PUBLICATIONS

Rabinowitz, M., "A Differential Carrier Phase Navigation System Combining GPS with Low Earth Orbit Satellites for Rapid Resolution of Integer Cycle Ambiguities," *PhD Thesis for Department of Electrical Engineering, Stanford University* (Dec. 2000), pp. 59–73.

Spilker, JR., J.J., "Fundamentals of Signal Tracking Theory," *Global Positioning System: Theory and Applications* (1994), vol. 1, Chapter 7, pp. 245–327.

Van Dierendock, A.J., "GPS Receivers," *Global Positioning System: Theory and Applications* (1995), vol. 1, Chapter 8, pp. 329–407.

Li, X., et al., "Indoor Geolocation Using OFDM Signals in HIPERLAN/2 Wireless LANS," $11^{th}$ IEEE International Symposium on Personal Indoor and Mobile Radio Communications, PIMRC 2000, Proceedings (Cat. No. 00TH8525), Proceedings of $11^{th}$ International Symposium on Personal Indoor and Mobile Radio Communication, London, UK, Sep. 18–21, pp. 1449–1453, vol. 2, XPO10520871, 2000, Piscataway, NJ, USA, IEEE, USA, ISBN; 9–7803–6463–5, Chapter I and III.

Rabinowitz, M., et al., "Positioning Using the ATSC Digital Television Signal," Rosum whitepaper, Online! 2001, XP002235053, Retrieved from the Internet on Mar. 13, 2003 at URL www.rosum.com/whitepaper 8–7–01.pdf.

EP Abstract/Zusammenfassung/Abrege, 02102666.1.

JP Abstract/vol. 007, No. 241 (P–232), Oct. 26, 1983 & JP58 129277 A (Nihon Musen KK) Aug. 2, 1983.

* cited by examiner

POSITION LOCATION USING BROADCAST TELEVISION SIGNALS AND MOBILE TELEPHONE SIGNALS

CROSS-REFERENCE TO RELATED APPLICATIONS

This application is a continuation-in-part of U.S. Non-provisional patent application Ser. No. 10/232,142, "Position Location using Broadcast Television Signals and Mobile Telephone Signals," by James J. Spilker, Jimmy K. Omura and Matthew Rabinowitz, filed Aug. 29, 2002, now U.S. Pat. No. 6,717,547 which is a continuation-in-part of the following U.S. Non-provisional patent applications: Ser. No. 09/887,158, "Position Location using Broadcast Digital Television Signals," by James J. Spilker and Matthew Rabinowitz, filed Jun. 21, 2001 now abandoned; Ser. No. 09/932,010, "Position Location using Terrestrial Digital Video Broadcast Television Signals," by James J. Spilker and Matthew Rabinowitz, filed Aug. 17, 2001; Ser. No. 10/054,302, "Position Location using Broadcast Analog Television Signals," by James J. Spilker and Matthew Rabinowitz, filed Jan. 22, 2002 now U.S. Pat. No. 6,559,800; Ser. No. 10/159,831, "Position Location Using Ghost Canceling Reference Television Signals," by James J. Spilker and Matthew Rabinowitz, filed May 31, 2002 now U.S. Pat. No. 6,522,297; and Ser. No. 10/054,262, "Time-Gated Delay Lock Loop Tracking Of Digital Television Signals," by James J. Spilker and Matthew Rabinowitz, filed Jan. 22, 2002, now abandoned the disclosures thereof incorporated by reference herein in their entirety.

U.S. Non-provisional patent application Ser. No. 10/232, 142 claims the benefit of U.S. Provisional patent application Ser. No. 60/315,983, "Digital Television Position Location Aided by GSM Measurements," by James J. Spilker Jr., filed Aug. 29, 2001; U.S. Provisional patent application Ser. No. 60/329,592, "Digital Television Position Location Aided by CDMA Measurements," by Jimmy K. Omura, filed Oct. 15, 2001; U.S. Provisional patent application Ser. No. 60/361, 762, "DTV Position Location Augmented by GPS," by James J. Spilker, filed Mar. 4, 2002; and U.S. Provisional Patent application Ser. No. 60/378,819, "Combining E-OTD with a TV Based Cell Phone Position Location System," by Jimmy K. Omura, filed May 7, 2002, the disclosures thereof incorporated by reference herein in their entirety.

BACKGROUND

The present invention relates generally to position determination, and particularly to position determination using broadcast television signals and mobile telephone signals.

There have long been methods of two-dimensional latitude/longitude position location systems using radio signals. In wide usage have been terrestrial systems such as Loran C and Omega, and a satellite-based system known as Transit. Another satellite-based system enjoying increased popularity is the Global Positioning System (GPS).

Initially devised in 1974, GPS is widely used for position location, navigation, survey, and time transfer. The GPS system is based on a constellation of 24 on-orbit satellites in sub-synchronous 12 hour orbits. Each satellite carries a precision clock and transmits a pseudo-noise signal, which can be precisely tracked to determine pseudo-range. By tracking 4 or more satellites, one can determine precise position in three dimensions in real time, world-wide. More details are provided in B. W. Parkinson and J. J. Spilker, Jr., Global Positioning System-Theory and Applications, Volumes I and II, AIAA, Washington, D.C. 1996.

GPS has revolutionized the technology of navigation and position location. However in some situations, GPS is less effective. Because the GPS signals are transmitted at relatively low power levels (less than 100 watts) and over great distances, the received signal strength is relatively weak (on the order of −160 dBw as received by an omni-directional antenna). Thus the signal is marginally useful or not useful at all in the presence of blockage or inside a building.

There has even been a proposed system using conventional analog National Television System Committee (NTSC) television signals to determine position. This proposal is found in a U.S. Patent entitled "Location Determination System And Method Using Television Broadcast Signals," U.S. Pat. No. 5,510,801, issued Apr. 23, 1996. However, the present analog TV signal contains horizontal and vertical synchronization pulses intended for relatively crude synchronization of the TV set sweep circuitry. Further, in 2006 the Federal Communication Commission (FCC) will consider turning off NTSC transmitters and reassigning that valuable spectrum so that it can be auctioned for other purposes deemed more valuable.

SUMMARY

In general, in one aspect, the invention features a method, apparatus, and computer-readable media for determining the position of a user terminal It comprises receiving at the user terminal a broadcast television signal from a television signal transmitter; determining a first pseudo-range between the user terminal and the television signal transmitter based on a known component of the broadcast television signal; receiving at the user terminal a mobile telephone signal from a mobile telephone base station; determining a second pseudo-range between the user terminal and the mobile telephone base station based on a known component of the mobile telephone signal; and determining a position of the user terminal based on the first and second pseudo-ranges, a location of the television signal transmitter, and a location of the mobile telephone base station; wherein the mobile telephone signal is selected from the group consisting of a EDGE (Enhanced Data Rates for Global System for Mobile Communications (GSM) Evolution) signal; a Code-Division Multiple Access 2000 (cdma2000) signal; and a Wideband Code-Division Multiple Access (WCDMA) signal.

Particular implementations can include one or more of the following features. The known component of the mobile telephone signal is selected from the group consisting of a training sequence; an unmodulated PN sequence; a preselected spreading code in a beacon channel of the mobile telephone signal; and a codeword in a synchronization channel of the mobile telephone signal. The broadcast television signal is selected from the group comprising an American Television Standards Committee (ATSC) digital television signal; a European Telecommunications Standards Institute (ETSI) Digital Video Broadcasting-Terrestrial (DVB-T) signal; a Japanese Integrated Services Digital Broadcasting-Terrestrial (ISDB-T) signal; and an analog television signal. Implementations comprise receiving at the user terminal a global positioning signal from a global positioning satellite; determining a third pseudo-range between the user terminal and the global positioning satellite based on the global positioning signal; and determining a position of the user terminal based on the first, second and third pseudo-ranges, a location of the television signal transmitter, a location of the mobile telephone base station, and a location of the global positioning satellite.

In general, in one aspect, the invention features a method, apparatus, and computer-readable media for determining the position of a user terminal. It comprises receiving at the user terminal a broadcast television signal from a television signal transmitter; determining a pseudo-range between the user terminal and the television signal transmitter based on a known component of the broadcast television signal; receiving at the user terminal a EDGE (Enhanced Data Rates for Global System for Mobile Communications (GSM) Evolution) mobile telephone signal from a mobile telephone base station, the mobile telephone signal comprising a timing advance parameter; determining a range between the user terminal and the mobile telephone base station based on the timing advance parameter; and determining a position of the user terminal based on the pseudo-range, the range, a location of the television signal transmitter, and a location of the mobile telephone base station.

Particular implementations can include one or more of the following features. The broadcast television signal is selected from the group comprising an American Television Standards Committee (ATSC) digital television signal; a European Telecommunications Standards Institute (ETSI) Digital Video Broadcasting-Terrestrial (DVB-T) signal; a Japanese Integrated Services Digital Broadcasting-Terrestrial (ISDB-T) signal; and an analog television signal. Implementations comprise determining a second pseudo-range between the user terminal and the mobile telephone base station based on a known component of the mobile telephone signal; and determining a position of the user terminal based on the first and second pseudo-ranges, the range, a location of the television signal transmitter, and a location of the mobile telephone base station. Implementations comprise receiving at the user terminal a global positioning signal from a global positioning satellite; determining a third pseudo-range between the user terminal and the global positioning satellite based on the global positioning signal; and determining a position of the user terminal based on the first, second and third pseudo-ranges, the range, a location of the television signal transmitter, a location of the mobile telephone base station, and a location of the global positioning satellite. Implementations comprise receiving at the user terminal a global positioning signal from a global positioning satellite; determining a second pseudo-range between the user terminal and the global positioning satellite based on the global positioning signal; and determining a position of the user terminal based on the first and second pseudo-ranges, the range, a location of the television signal transmitter, a location of the mobile telephone base station, and a location of the global positioning satellite.

In general, in one aspect, the invention features a method, apparatus, and computer-readable media for determining the position of a user terminal. It comprises receiving at the user terminal a broadcast television signal from a television signal transmitter; determining a first pseudo-range between the user terminal and the television signal transmitter based on a known component of the broadcast television signal; receiving at the user terminal a mobile telephone signal from a mobile telephone base station; determining a second pseudo-range between the user terminal and the mobile telephone base station based on a known component of the mobile telephone signal; and transmitting the first and second pseudoranges to a location server configured to determine a position of the user terminal based on the first and second pseudo-ranges, a location of the television signal transmitter, and a location of the mobile telephone base station; wherein the mobile telephone signal is selected from the group consisting of a EDGE (Enhanced Data Rates for Global System for Mobile Communications (GSM) Evolution) signal; a Code-Division Multiple Access 2000 (cdma2000) signal; and a Wideband Code-Division Multiple Access (WCDMA) signal.

Particular implementations can include one or more of the following features. The known component of the mobile telephone signal is selected from the group consisting of a training sequence; an unmodulated PN sequence; a preselected spreading code in a beacon channel of the mobile telephone signal; and a codeword in a synchronization channel of the mobile telephone signal. The broadcast television signal is selected from the group comprising an American Television Standards Committee (ATSC) digital television signal; a European Telecommunications Standards Institute (ETSI) Digital Video Broadcasting-Terrestrial (DVB-T) signal; a Japanese Integrated Services Digital Broadcasting-Terrestrial (ISDB-T) signal; and an analog television signal. Implementations comprise receiving at the user terminal a global positioning signal from a global positioning satellite; determining a third pseudo-range between the user terminal and the global positioning satellite based on the global positioning signal; and transmitting the first, second and third pseudoranges to a location server configured to determine a position of the user terminal based on the first, second and third pseudo-ranges, a location of the television signal transmitter, a location of the mobile telephone base station, and a location of the global positioning satellite.

In general, in one aspect, the invention features a method, apparatus, and computer-readable media for determining the position of a user terminal. It comprises receiving at the user terminal a broadcast television signal from a television signal transmitter; determining a pseudo-range between the user terminal and the television signal transmitter based on a known component of the broadcast television signal; receiving at the user terminal a EDGE (Enhanced Data Rates for Global System for Mobile Communications (GSM) Evolution) mobile telephone signal from a mobile telephone base station, the mobile telephone signal comprising a timing advance parameter; determining a range between the user terminal and the mobile telephone base station based on the timing advance parameter; and transmitting the pseudo-range and the range to a location server configured to determine a position of the user terminal based on the pseudorange, the range, a location of the television signal transmitter, and a location of the mobile telephone base station.

Particular implementations can include one or more of the following features. The broadcast television signal is selected from the group comprising an American Television Standards Committee (ATSC) digital television signal; a European Telecommunications Standards Institute (ETSI) Digital Video Broadcasting-Terrestrial (DVB-T) signal; a Japanese Integrated Services Digital Broadcasting-Terrestrial (ISDB-T) signal; and an analog television signal. Implementations comprise determining a second pseudo-range between the user terminal and the mobile telephone base station based on a known component of the mobile telephone signal; and transmitting the first and second pseudo-ranges and the range to a location server configured to determine a position of the user terminal based on the first and second pseudo-ranges, the range, a location of the television signal transmitter, and a location of the mobile telephone base station. Implementations comprise receiving at the user terminal a global positioning signal from a global positioning satellite; determining a third pseudo-range between the user terminal and the global positioning satellite based on the global positioning signal; and transmitting the first, second and third pseudo-ranges and the range to a location server configured to determine a position of the user terminal based on the first, second and third pseudo-ranges, the range, a location of the television signal transmitter, a location of the mobile telephone base station, and a location of the global positioning satellite. Implementations comprise receiving at the user terminal a global positioning signal from a global positioning satellite; determining a second pseudo-range between the user terminal and the global positioning satellite based on the global positioning signal; and transmitting the first and second pseudo-ranges and the range to a location server configured to determine a position of the user terminal based on the first and second pseudo-ranges, the range, a location of the television signal transmitter, a location of the mobile telephone base station, and a location of the global positioning satellite.

In general, in one aspect, the invention features a method, apparatus, and computer-readable media for determining the position of a user terminal. It comprises receiving a first pseudo-range from the user terminal, the first pseudo-range determined between the user terminal and a television signal transmitter based on a known component of a broadcast television signal transmitted by the television signal transmitter; receiving a second pseudo-range from the user terminal, the second pseudo-range determined between the user terminal and a mobile telephone base station based on a known component of a mobile telephone signal transmitted by the mobile telephone base station; and determining a position of the user terminal based on the first and second pseudo-ranges, a location of the television signal transmitter, and a location of the mobile telephone base station; wherein the mobile telephone signal is selected from the group consisting of a EDGE (Enhanced Data Rates for Global System for Mobile Communications (GSM) Evolution) signal; a Code-Division Multiple Access 2000 (cdma2000) signal; and a Wideband Code-Division Multiple Access (WCDMA) signal.

Particular implementations can include one or more of the following features. The known component of the mobile telephone signal is selected from the group consisting of a training sequence; an unmodulated PN sequence; a preselected spreading code in a beacon channel of the mobile telephone signal; and a codeword in a synchronization channel of the mobile telephone signal. The broadcast television signal is selected from the group comprising an American Television Standards Committee (ATSC) digital television signal; a European Telecommunications Standards Institute (ETSI) Digital Video Broadcasting-Terrestrial (DVB-T) signal; a Japanese Integrated Services Digital Broadcasting-Terrestrial (ISDB-T) signal; and an analog television signal. Implementations comprise receiving a third pseudo-range between the user terminal and a global positioning satellite based on a global positioning signal transmitted by the global positioning satellite; and determining a position of the user terminal based on the first, second and third pseudo-ranges, a location of the television signal transmitter, a location of the mobile telephone base station, and a location of the global positioning satellite.

In general, in one aspect, the invention features a method, apparatus, and computer-readable media for determining the position of a user terminal. It comprises receiving a pseudo-range between the user terminal and a television signal transmitter, the pseudo-range determined based on a known component of a broadcast television signal transmitted by the television signal transmitter; receiving a range between the user terminal and a mobile telephone base station, the range determined based on a timing advance parameter in a EDGE (Enhanced Data Rates for Global System for Mobile Communications (GSM) Evolution) mobile telephone signal transmitted by the mobile telephone base station; and determining a position of the user terminal based on the pseudorange, the range, a location of the television signal transmitter, and a location of the mobile telephone base station.

Particular implementations can include one or more of the following features. The broadcast television signal is selected from the group comprising an American Television Standards Committee (ATSC) digital television signal; a European Telecommunications Standards Institute (ETSI) Digital Video Broadcasting-Terrestrial (DVB-T) signal; a Japanese Integrated Services Digital Broadcasting-Terrestrial (ISDB-T) signal; and an analog television signal. Implementations comprise receiving a second pseudo-range between the user terminal and the mobile telephone base station, the second pseudo-range determined based on a known component of the mobile telephone signal; and determining a position of the user terminal based on the first and second pseudo-ranges, the range, a location of the television signal transmitter, and a location of the mobile telephone base station. Implementations comprise receiving a third pseudo-range between the user terminal and the global positioning satellite, the third pseudo-range determined based on a global positioning signal transmitted by the global positioning satellite; and determining a position of the user terminal based on the first, second and third pseudo-ranges, the range, a location of the television signal transmitter, a location of the mobile telephone base station, and a location of the global positioning satellite. Implementations comprise receiving a second pseudo-range between the user terminal and a global positioning satellite, the second pseudo-range determined based on a global positioning signal transmitted by the global positioning satellite; and determining a position of the user terminal based on the first and second pseudo-ranges, the range, a location of the television signal transmitter, a location of the mobile telephone base station, and a location of the global positioning satellite.

The leading digit(s) of each reference numeral used in this specification indicates the number of the drawing in which the reference numeral first appears.

DETAILED DESCRIPTION

Introduction

Broadcast television signals can be used to determine the position of a user terminal. Techniques for determining the position of a user terminal using the American Television Standards Committee (ATSC) digital television (DTV) signal are disclosed in commonly-owned copending U.S. Non-provisional patent application Ser. No. 09/887,158, "Position Location using Broadcast Digital Television Signals," by James J. Spilker and Matthew Rabinowitz, filed Jun. 21, 2001, the disclosure thereof incorporated by reference herein in its entirety. Techniques for determining the position of a user terminal using the European Telecommunications Standards Institute (ETSI) Digital Video Broadcasting-Terrestrial (DVB-T) signal are disclosed in commonly-owned copending U.S. Non-provisional patent application Ser. No. 09/932,010, "Position Location using Terrestrial Digital Video Broadcast Television Signals," by James J. Spilker and Matthew Rabinowitz, filed Aug. 17, 2001, the disclosure thereof incorporated by reference herein in its entirety. Techniques for determining the position of a user terminal using the Japanese Integrated Services Digital Broadcasting-Terrestrial (ISDB-T) signal are disclosed in commonly-owned copending U.S. Provisional Patent Application Ser. No. 60/337,834, "Wireless Position Location Using the Japanese ISDB-T Digital TV Signals," by James J. Spilker, filed Nov. 9, 2001, the disclosure thereof incorporated by reference herein in its entirety. Techniques for determining the position of a user terminal using the NTSC (National Television System Committee) analog television (TV) signal are disclosed in commonly-owned copending U.S. Non-provisional patent applications Ser. No. 10/054, 302, "Position Location using Broadcast Analog Television Signals," by James J. Spilker and Matthew Rabinowitz, filed Jan. 22, 2002, and Ser. No. (TBS, Attorney Docket Number RSM008001), "Position Location Using Ghost Canceling Reference Television Signals," by James J. Spilker and Matthew Rabinowitz, filed (TBS), the disclosures thereof incorporated by reference herein in their entirety.

Each of these television signals includes components that can be used to obtain a pseudo-range to the transmitter of the television signal. When multiple such pseudo-ranges are known, and the locations of the transmitters are known, the position of the user terminal can be determined with accuracy. Suitable components within the ATSC digital television signal include synchronization codes such as the Field Synchronization Segment within an ATSC data frame and the Synchronization Segment within a Data Segment within an ATSC data frame. Suitable components within the ETSI DVB-T and ISDB-T digital television signals include scattered pilot carriers. Suitable components within the NTSC analog television signal include the horizontal synchronization pulse, the horizontal blanking pulse, the horizontal blanking pulse and horizontal synchronization pulse taken together, the ghost canceling reference signal; and the vertical interval test signal.

In most urban regions there are a sufficient number of TV signals broadcast from different locations to permit a user terminal to measure pseudo-ranges from 3 or more different angles to determine the position of the user terminal. However in some regions hills, buildings, other obstructions, or even the body of a user may block one of the TV signals. Alternatively, the user terminal may simply be located in a rural region too distant from the required number of TV transmitters. In such cases the remaining pseudo-ranges can be supplied using signals transmitted by mobile telephone base stations. In addition, these pseudoranges can be supplemented using ranges obtained from range signals transmitted by mobile telephone base stations, such as the GSM Timing Advance parameter. Techniques for position location using broadcast television signals and signals transmitted by mobile telephone base stations are disclosed in U.S. Provisional Patent Application Ser. No. 60/315,983, "Digital Television Position Location Aided by GSM Measurements," by James J. Spilker Jr., filed Aug. 29, 2001; U.S. Provisional Patent Application Ser. No. 60/329,592, "Digital Television Position Location Aided by CDMA Measurements," by Jimmy K. Omura, filed Oct. 15, 2001; and U.S. Provisional Patent Application Ser. No. 60/378, 819, "Combining E-OTD with a TV Based Cell Phone Position Location System," by Jimmy K. Omura, filed May 7, 2002, the disclosures thereof incorporated by reference herein in their entirety. A user terminal using these techniques can determine its position using combinations of broadcast television signals and mobile telephone base station signals. In various implementations, the mobile telephone signals used include Global System for Mobile Communications (GSM) signals and Code-Division Multiple Access (CDMA) signals, as described in detail below.

Additional pseudoranges can be supplied using a standard global positioning system (GPS) receiver. Techniques for augmenting position location using broadcast television signals with GPS signals are disclosed in U.S. Provisional Patent Application Ser. No. 60/361,762, "DTV Position Location Augmented by GPS," by James J. Spilker, filed Mar. 4, 2002, the disclosure thereof incorporated by reference herein in its entirety. A user terminal using these techniques can determine its position using combinations of broadcast television signals mobile telephone base station signals, and GPS signals.

Figure 1:
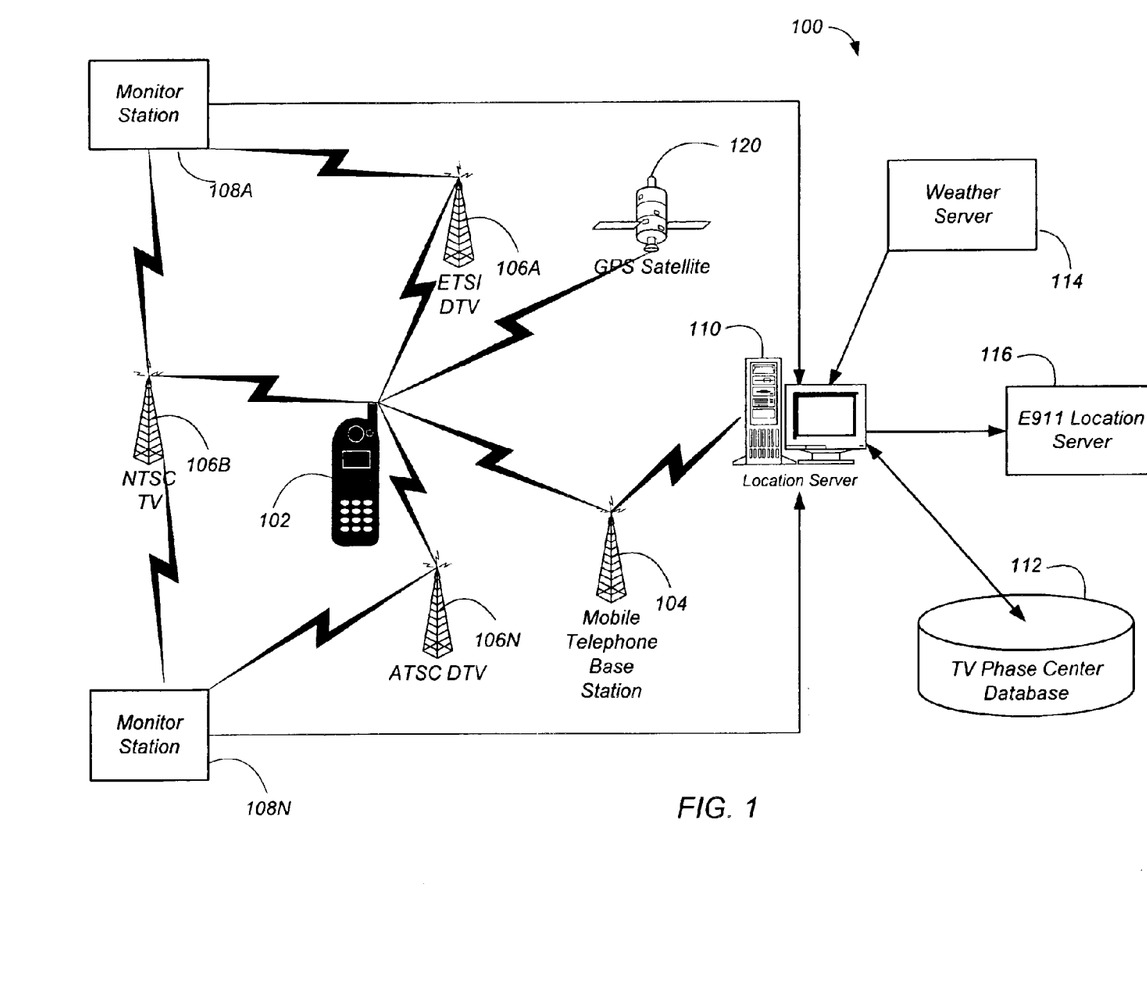
FIG. 1 depicts an implementation of the present invention including a user terminal that communicates over an air link with a base station.

Referring to FIG. 1, an example implementation 100 includes a user terminal 102 that communicates over an air link with a base station 104. In some implementations, user terminal 102 is a wireless telephone and base station 104 is a wireless telephone base station. In some implementations, base station 104 is part of a mobile MAN (metropolitan area network) or WAN (wide area network).

FIG. 1 is used to illustrate various aspects of the invention but the invention is not limited to this implementation. For example, the phrase "user terminal" is meant to refer to any object capable of implementing the position location techniques described herein. Examples of user terminals include PDAs, mobile phones, cars and other vehicles, and any object which could include a chip or software implementing the position location techniques described herein. Further, the term "user terminal" is not intended to be limited to objects which are "terminals" or which are operated by "users."

Position Location Performed by a Location Server

Figure 2:
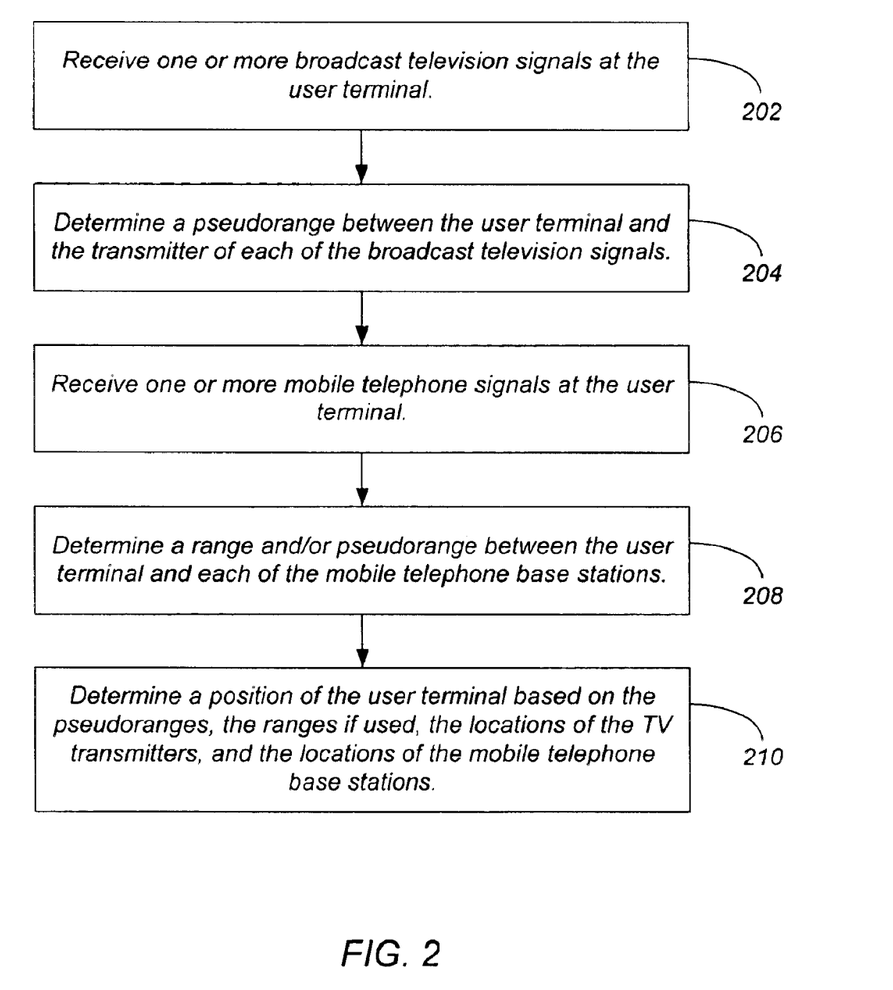
FIG. 2 illustrates an operation of an implementation of the invention.

FIG. 2 illustrates an operation of implementation 100. User terminal 102 receives broadcast signals from one or more TV transmitters 106A and 106B through 106N (step 202). Referring to FIG. 1, TV transmitter 106A is a ETSI transmitter, TV transmitter 106B is a NTSC transmitter, and TV transmitter 106N is a ATSC transmitter, although other combinations are contemplated, including transmitters of the ISDB signal used in Japan.

Various methods can be used to select which TV channels to use in position location. In one implementation, a location server 110 tells user terminal 102 of the best TV channels to monitor. In some implementations, user terminal 102 exchanges messages with location server 110 by way of base station 104. In some implementations user terminal 102 selects TV channels to monitor based on the identity of base station 104 and a stored table correlating base stations and TV channels. In some implementations, user terminal 102 can accept a location input from the user that gives a general indication of the location of the user terminal, such as the name of the nearest city; and uses this information to select TV channels for processing. In some implementations, user terminal 102 scans available TV channels to assemble a fingerprint of the location based on power levels of the available TV channels. User terminal 102 compares this fingerprint to a stored table that matches known fingerprints with known locations to select TV channels for processing.

User terminal 102 determines a pseudo-range between the user terminal and each TV transmitter 106 (step 204). Each pseudo-range represents the time difference (or equivalent distance) between a time of transmission from a transmitter 106 of a component of the TV broadcast signal and a time of reception at the user terminal 102 of the component, as well as a clock offset at the user terminal.

User terminal 102 transmits the pseudo-ranges to location server 110. In some implementations, location server 110 is implemented as a general-purpose computer executing software designed to perform the operations described herein. In another implementation, location server is implemented as an ASIC (application-specific integrated circuit), or some other sort of device. In some implementations, location server 110 is implemented within or near base station 104.

The TV signals are also received by a plurality of monitor units 108A through 108N. Each monitor unit 108 can be implemented as a small unit including a transceiver and processor, and can be mounted in a convenient location such as on a utility pole, TV transmitter 106, or base station 104. In some implementations, monitor units 108 are implemented on satellites.

Each monitor unit 108 measures, for each of the TV transmitters 106 from which it receives TV signals, a time offset between the local clock of that TV transmitter and a reference clock. In some implementations the reference clock is derived from GPS signals. The use of a reference clock permits the determination of the time offset for each TV transmitter 106 when multiple monitor units 108 are used, since each monitor unit 108 can determine the time offset with respect to the reference clock. Thus, offsets in the local clocks of the monitor units 108 do not affect these determinations. Monitor units 108 are described in detail in U.S. Ser. Nos. 09/887,158, 09/932,010, and 10/054,302, the disclosures thereof incorporated by reference herein in their entirety.

In another implementation, no external time reference is needed. According to this implementation, a single monitor unit 108 receives TV signals from all of the same TV transmitters as does user terminal 102. In effect, the local clock of the single monitor unit functions as the time reference.

In some implementations, each time offset is modeled as a fixed offset. In another implementation each time offset is modeled as a second order polynomial fit of the form $$\text{Offset}=a+b(t-T)+c(t-T)^2 \quad (1)$$

that can be described by a, b, c, and T. In either implementation, each measured time offset is transmitted periodically to the location server using the Internet, a secured modem connection or the like. In some implementations, the location of each monitor unit 108 is determined using GPS receivers.

Location server 110 receives information describing the phase center (i.e., the location) of each TV transmitter 106 from a database 112. In some implementations, the phase center of each TV transmitter 106 is measured by using monitor units 108 at different locations to measure the phase center directly. In another implementation, the phase center of each TV transmitter 106 is measured by surveying the antenna phase center.

In some implementations, location server 110 receives weather information describing the air temperature, atmospheric pressure, and humidity in the vicinity of user terminal 102 from a weather server 114. The weather information is available from the Internet and other sources such as NOAA. Location server 110 determines tropospheric propagation velocity from the weather information using techniques such as those disclosed in B. Parkinson and J. Spilker, Jr. Global Positioning System-Theory and Applications, AIAA, Washington, D.C., 1996, Vol. 1, Chapter 17 Tropospheric Effects on GPS by J. Spilker, Jr.

Location server 110 can also receive from base station 104 information which identifies a general geographic location of user terminal 102. For example, the information can identify a cell or cell sector within which a cellular telephone is located. This information is used for ambiguity resolution.

User terminal 102 receives mobile telephone signals from one or more mobile telephone base stations 104 (step 206). The mobile telephone signals can include range signals such as the GSM timing advance parameter. User terminal 102 determines a range and/or pseudo-range between the user terminal and each mobile telephone base station 104 (step 208). The range can be obtained from the range signal, as described in detail below. Each pseudo-range represents the time difference (or equivalent distance) between a time of transmission from a mobile telephone base station 104 of a component of the mobile telephone signal and a time of reception at the user terminal 102 of the component, as well as a clock offset at the mobile telephone base station. User terminal 102 transmits the pseudo-ranges to location server 110.

Figure 3:
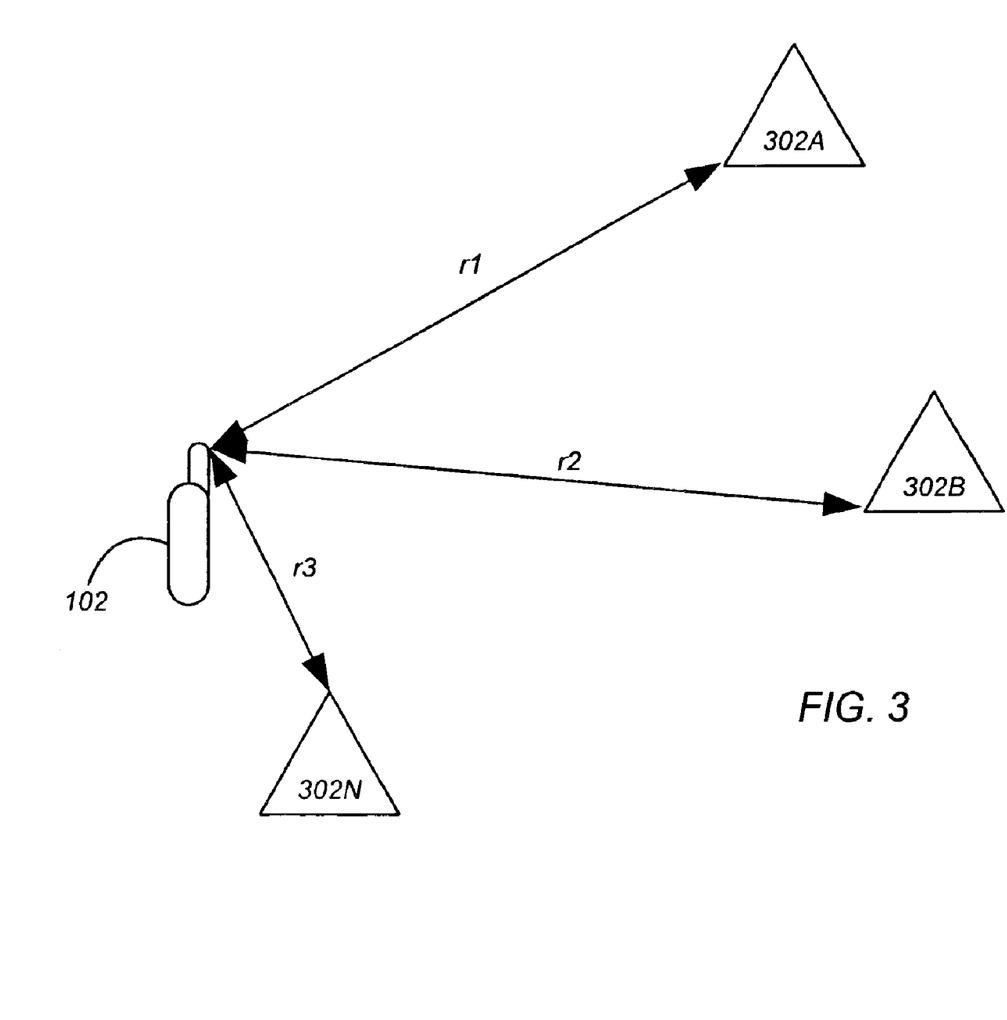
FIG. 3 depicts the geometry of a position determination using 3 DTV transmitters.

Location server 110 determines a position of the user terminal based on the pseudo-ranges, the ranges if used, a location of each of the TV transmitters 106, and a location of the mobile telephone base stations 104 (step 210). FIG. 3 depicts the geometry of a position determination using three transmitters 302. Transmitters 302 can include any combination of TV transmitters and mobile telephone base stations. Transmitter 302A is located at position (x1, y1, z1). The range between user terminal 102 and transmitter 302A is r1. Transmitter 302B is located at position (x2, y2, z2). The range between user terminal 102 and transmitter 302B is r2. Transmitter 302N is located at position (x3, y3, z3). The range between user terminal 102 and transmitter 302N is r3.

Location server 110 may adjust the value of each pseudo-range according to the tropospheric propagation velocity and the time offset for the corresponding transmitter 302. Location server 110 uses the phase center information from database 112 to determine the position of each transmitter 302. The locations of and clock offsets for GSM base stations can be obtained from the E-OTD assistance data broadcast message transmitted by the GSM base station.

User terminal 102 makes three or more pseudo-range measurements to solve for three unknowns, namely the position (x, y) and clock offset T of user terminal 102. It is assumed that the altitude of the user terminal is known to within the necessary degree of accuracy and only the latitude and longitude of the user terminal need to be precisely determined. Of course, it is possible to solve for position of the user terminal in three dimensions, namely (x, y, z) assuming that four or more transmitters are available, and the geometry of those transmitters is sufficient. It would be clear to one skilled in the art how to adjust the techniques described herein for a 3-Dimensional position fix.

The three pseudo-range measurements pr1, pr2 and pr3 are given by $$pr1 = r1 + T \quad (2)$$

$$pr2 = r2 + T \quad (3)$$

$$pr3 = r3 + T \quad (4)$$

The three ranges can be expressed as $$r1 = |X - X1| \quad (5)$$

$$r2 = |X - X2| \quad (6)$$

$$r3 = |X - X3| \quad (7)$$

where X represents the three-dimensional vector position (x, y, z) of user terminal, X1 represents the three-dimensional vector position (x1, y1, z1) of transmitter 302A, X2 represents the three-dimensional vector position (x2, y2, z2) of transmitter 302B, and X3 represents the three-dimensional vector position (x3, y3, z3) of transmitter 302N. These relationships produce three equations in which to solve for the three unknowns x, y, and T. Notice that in the case that only latitude and longitude are required, location server 110 assumes some estimate for z and does not solve for it as for the other unknown co-ordinates. In one implementation, using a terrain map, the initial estimate of z can be iteratively refined based on the computed values for x and y. In another implementation, location server 110 actively solves for z. Location server 110 solves these equations according to conventional well-known methods. In an E911 application, the position of user terminal 102 is transmitted to E911 location server 116 for distribution to the proper authorities. In another application, the position is transmitted to user terminal 102.

In some implementations, user terminal 102 does not compute pseudo-ranges, but rather takes measurements of the signals that are sufficient to compute pseudo-range, and transmits these measurements to location server 110. Location server 110 then computes the pseudo-ranges based on the measurements, and computes the position based on the pseudo-ranges, as described above.

Position Location Performed by User Terminal

In some implementations, the position of user terminal 102 is computed by user terminal 102. In this implementation, all of the necessary information is transmitted to user terminal 102. This information can be transmitted to user terminal 102 by location server 110, base station 104, one or more TV transmitters 106, mobile telephone base stations 104, or any combination thereof. User terminal 102 then measures the pseudo-ranges and solves the simultaneous equations as described above. This implementation is now described.

User terminal 102 receives the time offset between the local clock of each TV transmitter 106 and a reference clock. User terminal 102 also receives information describing the phase center of each TV transmitter 106 from a database 112.

User terminal 102 receives the tropospheric propagation velocity computed by location server 110. In some implementation, user terminal 102 receives weather information describing the air temperature, atmospheric pressure, and humidity in the vicinity of user terminal 102 from a weather server 114, and determines tropospheric propagation velocity from the weather information using conventional techniques.

User terminal 102 can also receive from base station 104 information which identifies the rough location of user terminal 102. For example, the information can identify a cell or cell sector within which a cellular telephone is located. This information is used for ambiguity resolution.

User terminal 102 receives TV signals from one or more TV transmitters 106 and determines a pseudo-range between the user terminal 102 and each TV transmitter 106. User terminal 102 receives mobile telephone signals from one or more mobile telephone base stations 104, and determines pseudo-ranges and/or ranges between the user terminal 102 and the mobile telephone base stations 104. User terminal 102 then determines its position based on the pseudo-ranges, the ranges if used, the locations of the TV transmitters 106, and the locations of the mobile telephone base stations 104.

In any of these implementations, the position of user terminal 102 can be determined using a TV transmitter and the offset T computed during a previous position determination for that TV transmitter. The values of T can be stored or maintained according to conventional methods.

In some implementations, base station 104 determines the clock offset of user terminal 102. In this implementation, only two transmitters are required for position determination. Base station 104 transmits the clock offset T to location server 110, which then determines the position of user terminal 102 from the pseudo-range computed for each of the transmitters.

Position Location using the GSM Mobile Telephone Signal

The GSM mobile telephone signal is a frequency division multiple access/time division multiple access (FDMA/TDMA) signal with a 200 kHz bandwidth and a bit rate of 1625/6=270.83333 kbps. The GSM signal has 124 each 200 kHz frequency channels plus a 200 kHz guard band for a total bandwidth of 25 MHz for transmit and 25 MHz for receive. Each frequency channel is then modulated by a 270.8333 kbps Gaussian minimal shift keyed signal with a TDMA frame subdivided into 8 time slots shared by 8 different active users. Thus the system has a capacity of 8×124=992 time slots. A pair of frequency channels with 45 MHz separation is allocated to a given duplex channel.

The GSM signal has 5 different burst formats: normal burst, frequency correction burst, synchronization burst, dummy burst, and access burst. The frequency correction burst has a pure carrier component for all but the 6 tail bits plus guard time. Because of the 0.3 GMSK modulation a stream of "0" bits generates a pure carrier with a frequency shift of 1625/24 kHz=67.7+kHz above the nominal carrier frequency. This pure carrier is used by the user terminal to correct its local crystal oscillator. The synchronization burst is used for timing with a 64 bit training sequence in place of the normal 26 bit training sequence. The dummy burst has no data but is otherwise the same as the normal burst. The access burst has a much larger 68.25 guard space, a 41 bit training sequence, and only 36 data bits.

Figure 4:
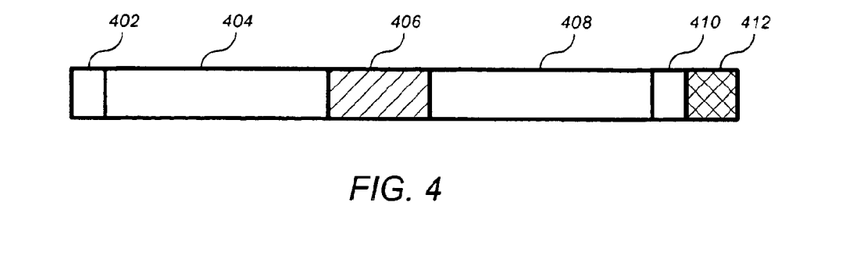
FIG. 4 shows the format for the normal burst of the GSM signal.

The format for the normal burst is shown in FIG. 4. The format includes 3 tail bits 402, followed by 57 data bits 404, followed by a 26-bit synchronization training sequence 406, followed by 57 data bits 408, followed by 3 tail bits 410, followed by 8.25 guard bits 412.

The training sequences in these various burst formats are known bit patterns which are used by embodiments of the present invention for timing synchronization. There are 8 different training sequences for the normal burst transmission which are designated by the base station color code. Training sequences are used both to adjust the adaptive equalizers and to correct for propagation delay.

User terminals enter the system by making requests on one of the random access channels. However in order for the TDMA signals with 8 bursts per TDMA frame to operate properly, user terminals at different distances from the base station must transmit their TDMA bursts at different time offsets in order for their TDMA busts to be received at the base station with proper timing and no overlap between bursts.

For this purpose the base station transmits a range signal comprising a timing advance parameter. Of course if other such other range signals are available, they can be used instead. The timing advance parameter has 64 steps corresponding to 1 data bit each, and corresponds to twice the one-way propagation time. Thus each increment is 1.846 microseconds or 1846 ft of range for free-space propagation. Thus the timing advance parameter by itself gives a range accuracy from the base station to the user terminal of approximately +/−307.6 yards or 302.7 meters. Although this accuracy is not as good as might be desired, it is already available at the user terminal, and when combined with the high accuracy of the television signal measurements, produces an acceptable solution in outlying areas where only two TV signals are in view with good geometry.

Figure 5:
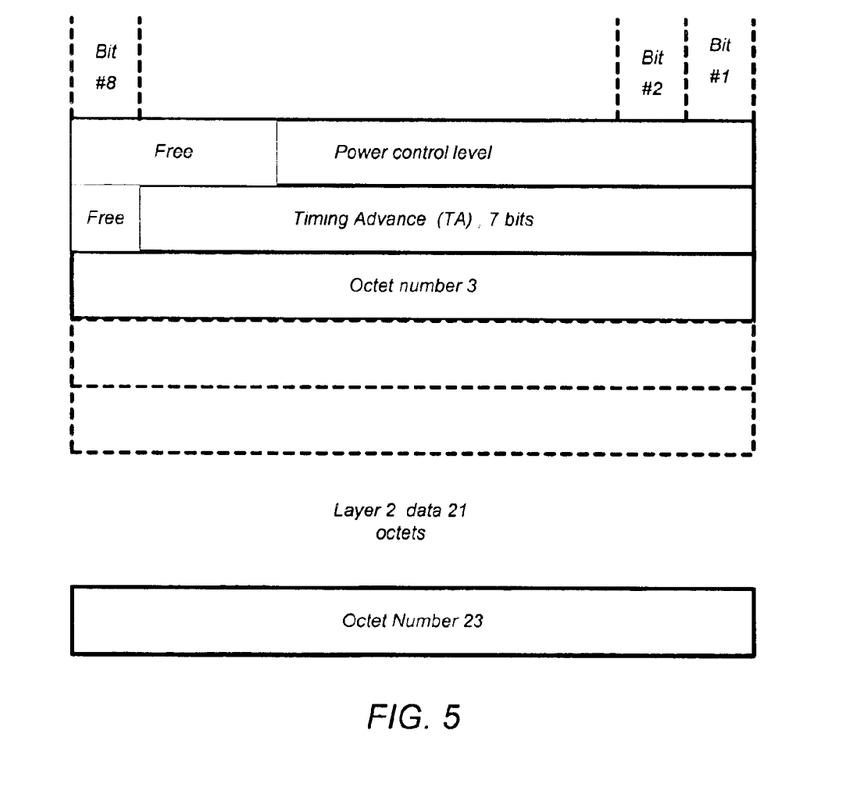
FIG. 5 shows the format of the SACCH channel.

The timing advance parameter is transmitted as one of the signaling channels used in GSM. There are 3 dedicated control channels (DCCH) in the set of signaling channels. One of these DCCH channels is a two-way (between the user terminal and the base station) slow associated control channel (SACCH) channel, which contains the 7-bit timing advance information. The format of the SACCH channel is shown in FIG. 5. These link control parameters are measured and updated every 480 ms.

Figure 6:
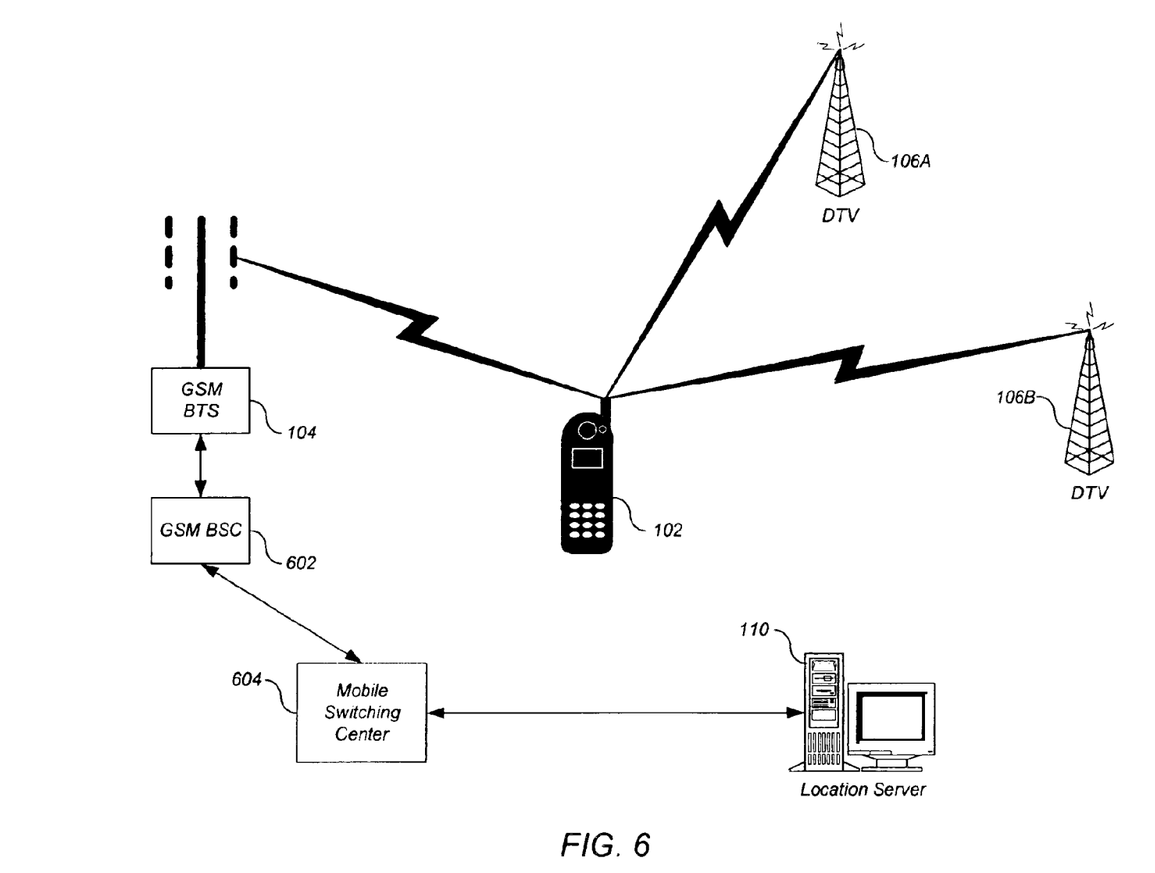
FIG. 6 shows a system configuration with only two DTV transmitters in view with good geometry, and with only one GSM base station in view, of a user terminal.

FIG. 6 shows a system configuration with only two DTV transmitters 106 in view with good geometry, and with only one GSM base station 104 in view, of user terminal 102. Of course, if additional GSM base stations 104 are in view their signals can be used to improve the accuracy of the position location. Signals are relayed from user terminal 102 to location server 110 by GSM base station transceiver system (BTS) 104, base station controller (BSC) 602, and mobile switching center 604.

The GSM system measurements can take one of several forms. One embodiment uses the normal GSM timing advance parameter, which is always provided. The accuracy is not as good as might be desired. However, it requires no addition to normal GSM operation except that the timing advance is also fed to location server 110 along with the other DTV signal measurements, for example using one or more GSM short message service (SMS) messages. Location server 110 then incorporates the timing advance measurement along with location information of base station 104 to solve for the position of user terminal 102.

Another embodiment measures the pseudorange between user terminal 102 and base station 104, and uses this pseudorange along with the pseudoranges between user terminal 102 and DTV transmitters 106 to solve for the position of the user terminal with higher accuracy. This embodiment includes a pseudorange delay lock loop operating on the GSM training sequence. The training sequence for normal bursts does not have a 100% duty factor, but rather has a duty factor of 26/(156.25×8)=2.08%. Nonetheless, for a 1 second averaging time the GSM normal burst training sequence has a processing gain of 270,833× 0.0208=5633 or 37.5 dB. Of course, the training sequences in other types of GSM bursts can be used as well.

Other embodiments use one or more timing advance measurements, and one or more pseudoranges between user terminal 102 and base stations 104, in addition to the pseudoranges between user terminal 102 and DTV transmitters 106.

Figure 7:
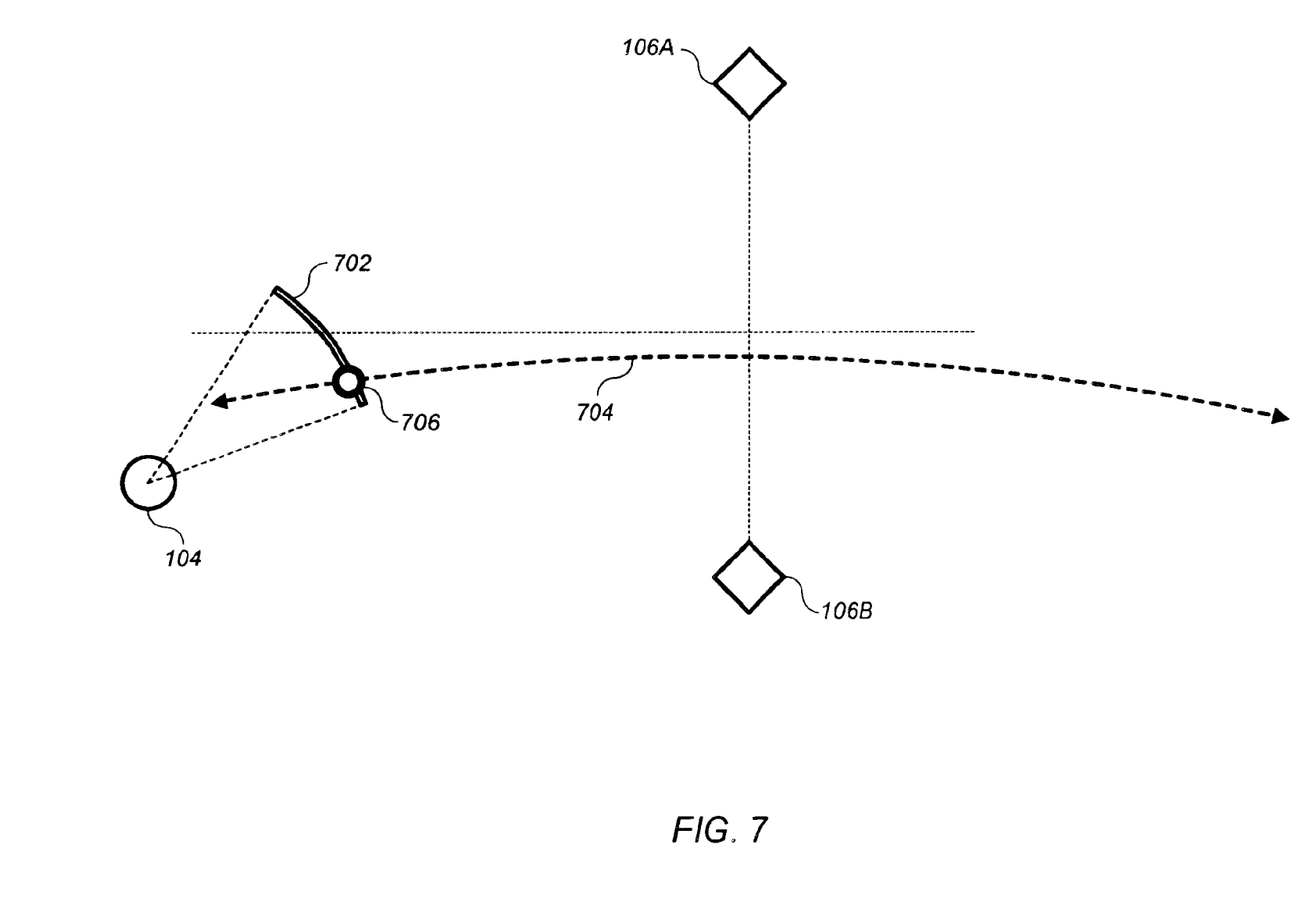
FIG. 7 shows a position solution using the GSM timing advance without further modification, along with the measurements of two DTV signals.

FIG. 7 shows a position solution using the GSM timing advance without further modification, along with the measurements of two DTV signals. In this simple example, the GSM timing advance provides a locus of solutions which is simply an arc 702 of radius corresponding to the timing advance in nanoseconds times the speed of light in the atmosphere. The angular width of arc 702 corresponds to the angular coverage of the k-sector antenna; with 8 sectors the angular width is 360/8=45 degrees. The two DTV solution simply gives a hyperbola 704 corresponding to the delay difference. The position solution is then the intersection 706 of arc 702 and the appropriate hyperbola 704. Other approaches to solution can be found also.

Figure 8:
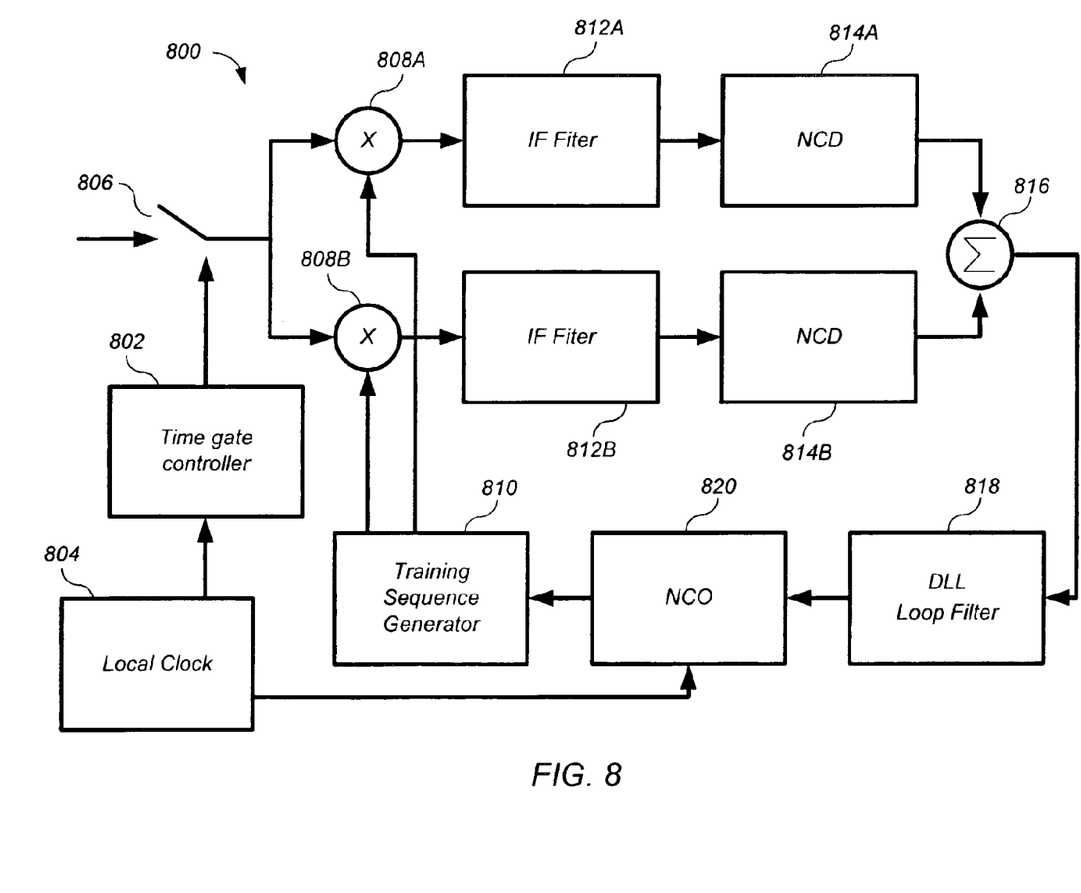
FIG. 8 shows a simplified configuration of a time-gated delay lock loop that is used to measure the pseudorange by comparing the measured synchronization time with the local reference clock in the user terminal in one embodiment.

FIG. 8 shows a simplified configuration of a time-gated delay lock loop (TGDLL) receiver 800 that is used to measure the pseudorange by comparing the measured synchronization time with the local reference clock in the user terminal in one embodiment. Time-gated DLLs are disclosed in detail in U.S. Non-provisional patent application Ser. No. 10/054,262, "Time-Gated Delay Lock Loop Tracking Of Digital Television Signals," by James J. Spilker and Matthew Rabinowitz, filed Jan. 22, 2002, the disclosure thereof incorporated by reference herein in its entirety.

Although FIG. 8 shows a noncoherent type delay lock loop, it should be understood that coherent forms of the time-gated delay lock loop can be used as well. Because the GSM receiver must operate coherently, there is sufficient signal level and clock recovery to operate the DLL in the coherent mode.

Time-gate controller 802 generates a time-gate signal that turns the memoryless elements of receiver 800 on and off to conserve power, such that these elements are operational and producing signals only when those signals are needed. Time-gate controller 802 is controlled by timing signals generated by local clock 804 based on the timing of the training sequence. Elements in the front end of the receiver (not shown) can be time-gated as well. This saves substantial power, making implementations especially suitable for portable devices having limited power resources.

The received GSM signal is passed by a switch 806, also controlled by time-gate controller 802, to a pair of mixers 808A and 808B, where it is mixed with I and Q samples of the training sequence, respectively, which are provided by training sequence generator 810. The outputs of mixers 808, after filtering by respective IF filters 812A and 812B, drive non-coherent detectors (NCD) 814A and 814B, respectively. The outputs of NCDs 814 are combined by a summer 816 and filtered by a DLL loop filter 818. The output of filter 818 drives a number-controlled oscillator (NCO) 820 that is clocked by local clock 804 and drives training sequence generator 810.

TGDLL 800 can use not only the 26-bit training sequence in the GSM normal bursts, but also training sequences in the other GSM bursts and various control signals broadcast from GSM base station 104. These various approaches permit measurements with a greater accuracy than that obtained using the timing advance parameter alone. In some embodiments the timing advance parameter is used as an acquisition aid.

Location processor 110 also accounts for the position of the base station antenna and the sector being used by the user terminal. In addition, the clock timing of the base station must be known. This is easily accomplished if the base station clock is locked to GPS or some other timing source, and the distance from the clock to the antenna is calculated or measured.

Either of these two approaches, using the timing advance parameter alone or measuring the pseudorange to the GSM base station, permits position location with only two DTV towers in good geometry. Of course if more base stations or DTV towers are in view additional performance improvements can be obtained.

Position Location using the cdmaOne Mobile Telephone Signal

One of the most widely used digital cellular systems in use today is based on the United States IS-95 CDMA standard, referred to herein as cdmaOne. The cdmaOne cellular system makes use of spread spectrum signals that are robust to interference and multipath. This robustness to interference allows all cdmaOne cell sites to use the same transmit and receive frequency bands. To minimize interference between cell sites, each cdmaOne base station signal uses spread spectrum transmit signals based on pseudo noise (PN) bit sequences generated by linear feedback generators where the in-phase generator is given by the polynomial $$f_I(x)=1+x^2+x^6+x^7+x^8+x^{10}+x^{15} \quad (8)$$

and the quadrature generator is given by the polynomial $$f_Q(x)=1+x^3+x^4+x^5+x^9+x^{10}+x^{11}+x^{12}+x^{15} \quad (9)$$

These are maximal length shift register sequences with period 215−1=32,767.

Every cdmaOne base station signal uses these same in-phase and quadrature PN sequences. These sequences modulating a carrier act much like a higher-level carrier over which data is modulated. The chip rate for each signal is 1.2288 Mcps. Each period of the sequence repeats every 26.66 milliseconds or 75 times every 2 seconds.

To minimize interference at the user terminal from different cell site transmissions using the same frequency band, each cell site PN sequence is offset by some multiple of 64 chips. There are 512 unique offsets. All base stations in an area use different offsets to minimize interference and aid user terminal acquisition of the strongest base station signal. This method of using offsets of the same sequences in transmit signals requires that all base stations maintain a stable time reference that allows for time synchronization of their transmitters. All cdmaOne cell sites obtain their time reference with GPS receivers.

The IS-95 digital cellular system operates in the same band as the current analog cellular band (AMPS) in which full-duplex operation is achieved by using frequency division duplexing with 25 MHz in each direction, with an uplink (user terminal to base station) band of 869–894 MHz and a downlink (base station to user terminal) band of 824–849 MHz. The 25 MHz band for each direction is divided into 20 bands where each band of 1.25 MHz uses a single carrier with a PN sequence in the in-phase and quadrature components with a chip rate of 1.2288 Mcps.

Each downlink signal in the 1.25 MHz band has 64 channels including a high power pilot channel, low power synchronization channel, and 62 paging and traffic channels. The pilot channel allows user terminals to acquire and track base station signals. A user terminal acquires the strongest of these unmodulated pilot channel signals from different base stations it finds by ranging over all the offset time shifts of the PN sequences. The synchronization channel allows user terminals to time-synchronize to the selected base station network. Each of these downlink channels use one of 64 orthogonal Walsh codewords which allow separation of the channels that are using the same 1.25 MHz band. A user terminal uses one of the 64 Walsh codeword to receive from one of these base station channels.

The pilot channel is the highest power channel and uses the all zero Walsh codeword, which means that this signal is unmodulated PN sequence. This pilot channel is orthogonal to all the other channels when cross correlations are done over the time interval of the 64-bit Walsh codeword. In order to obtain a pseudorange measurement, TGDLL 800 of FIG. 8 can be implemented in user terminal 102, where training sequence generator 810 generates the unmodulated PN sequence.

Position Location using the WCDMA Mobile Telephone Signal

Of the third-generation mobile telephone systems, Wideband Code Division Multiple Access (WCDMA) is expected to be the most widely adopted. The WCDMA specification has been created in the 3rd Generation Partnership Project (3GPP), which is the joint standardization project of the standardization bodies from Europe, Japan, Korea, the USA, and China. Within 3GPP, WCDMA is called UTRA (Universal Terrestrial Radio Access) FDD (Frequency Division Duplex) and TDD (Time Division Duplex), the name WCDMA being used to cover both FDD and TDD operation.

Like cdmaOne, the first Code Division Multiple Access (CDMA) system, WCDMA uses pseudo random sequence generated QPSK modulated carriers but at a higher chip rate of 3.84 Mcps with carrier spacing of 5 MHz. The signal format combines a CDMA channelization (similar to cdmaOne) using QPSK modulation with a timeslot system similar to GSM. The frame rate is 100 frames a second with 15 time slots per frame. For uplink/downlink duplexing there are two possible modes: frequency division duplexing (FDD) and time division duplexing (TDD).

The TDD mode allows deployment in areas with limited spectrum availability. For TDD there are 15 timeslots per frame. Each timeslot can be allocated to uplink and downlink use. The burst formats are similar to that of GSM but with 2,560 chips per burst instead of 156.25 bits. Each TDD traffic burst has a known code of 256 chips or 512 chips between data symbols in the burst format.

The TDD broadcast signal includes beacon channels that have the same burst formats as the traffic channels but use preselected spreading codes that serve as frame synchronization markers. Embodiments of the present invention employ known components of the WCDMA TDD signal to obtain pseudoranges for position location. These components include the spreading codes in the WCDMA beacon channels.

The FDD form of WCDMA is expected to be the more widely used of the WCDMA systems. As with GSM, some parts of the signal transmitted from WCDMA base stations are called the synchronization channel (SCH), and are used by mobile phones to do cell search. There are two types of SCH channels, primary and secondary, both of which do not contain any scrambling on top. Both primary and secondary SCHs are sent in parallel time slots in different channels.

The primary SCH channel contains a code word with 256 chips, with an identical code word in every cell without any modulation. This code word occurs at the beginning of every timeslot, and is constructed from shorter 16-chip sequences in order to detect this sequence with no a priori timing information, typically with a matched filter correlator. This 256 chip pattern repeats with a 2,560 chip period. This primary SCH channel is used by mobile telephones to initially synchronize to the base station broadcast signal.

The secondary SCH channel contains SCH code words having sequences that are similar but vary from one base station to another, with a total of 16 sequences in use. These 16 sequences are used to generate a total of 64 different code words which identify to which of the 64 code groups a base station belongs. In every frame of the secondary SCH channel there are 15 time slots where a secondary SCH code word of 256 chips occurs, giving a total of 3,840 chips per every frame and a pattern that repeats with a 38,400 chip period.

For each base station broadcast there is a common pilot channel for use by mobile devices for channel estimation and handover including cell selection. The pilot channel is an unmodulated code channel, which is scrambled with the cell-specific primary scrambling code. There are 512 distinct Gold scrambling codes whose code period is truncated to 10 ms. The broadcast channel data is carried on the Primary common Control Physical Channel. Both the common pilot channel and the data broadcast channel have the structure shown in FIG. 9. The SCH code words for the purpose of synchronization are shown multiplexed in each slot of these base station broadcast signals.

Figure 9:
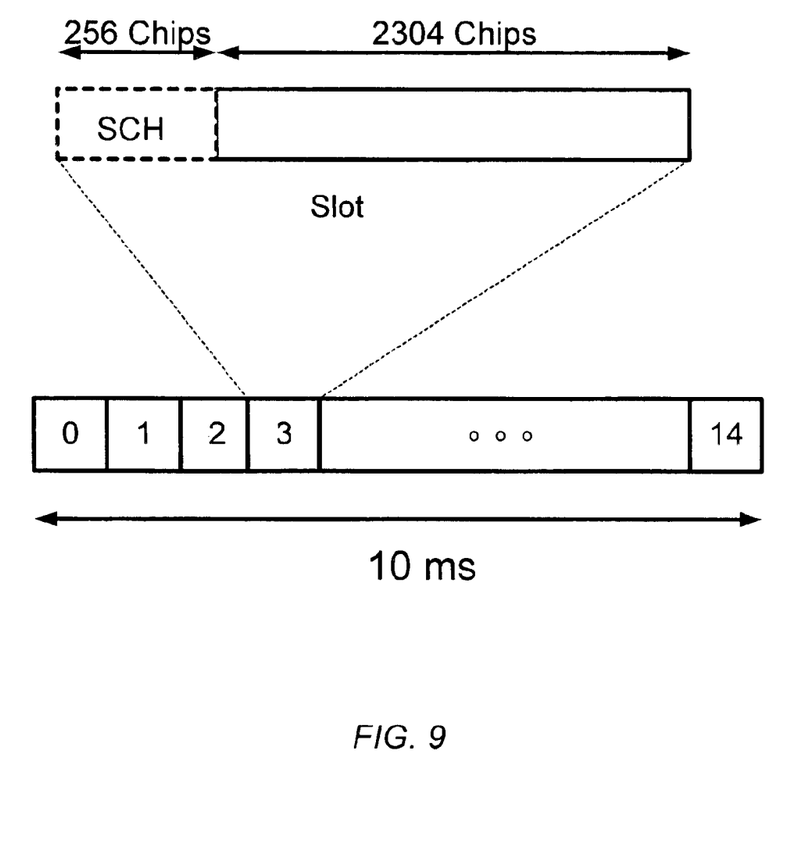
FIG. 9 shows the structure of the common pilot channel and the data broadcast channel of the Wideband Code Division Multiple Access (WCDMA) signal.

The WCDMA signal includes idle periods in downlink (IDPL) which are gaps in transmission of one slot every 100 ms. During these gaps user terminal 102 can measure the pilot signal from a neighboring base station 104. However, base stations 104 themselves may or may not be synchronized with respect to one another. When base stations 104 are synchronized, user terminal 102 simply makes measurements on each of several base stations 104 and compares them in pairs to provide hyperbolic loci of the position of user terminal 102. When base stations 104 are not synchronized, the same result can be obtained by measuring the relative time offset of the base station clocks. Alternatively a monitor station 108 can measure the offset parameters of each base station 104.

Embodiments of the present invention employ known components of the WCDMA FDD signal to obtain pseudoranges for position location. These components include the extended training sequence of the Synchronization Channel (SCH) of the base station broadcast signal. The primary SCH codewords can be used initially to achieve the initial synchronization with the broadcast signal. The secondary SCH codewords can be used to improve the pseudorange measurement, and also to identify the base station transmitting the broadcast signal. Embodiments of the present invention also take advantage of the common pilot channel which is an unmodulated code channel that is scrambled with the cell-specific primary scrambling code.

Position Location using the cdma2000 Mobile Telephone Signal

The cdma2000 system provides an evolution path for existing cdmaOne (IS-95) systems. The cdma2000 system is based partly on IS-95 principles with respect to synchronous network operation and common pilot channels, but is a wideband signal with three times the bandwidth of IS-95. In cdma2000, three IS-95 carriers each with 1.25 MHz bandwidth are bundled to form a multi-carrier transmission in the downlink with approximately 3.75 MHz bandwidth in a 5 MHz deployment. As in cdmaOne, all the cell sites of cdma2000 are synchronized, and time-shifted versions of the same unmodulated spreading sequence are used by all the cell sites in a pilot channel.

Embodiments of the present invention employ known components of the cdma2000 signal to obtain pseudoranges for position location. These components are similar to the components describe above for the cdmaOne signal. And because the base station signals are synchronized, the identity of a base station can be determined from the time offset of its pilot channel broadcast signal.

Position Location using the EDGE Mobile Telephone Signal

The enhanced data rates for GSM evolution (EDGE) signal is a high-data rate evolution of GSM. The EDGE signal replaces the GSM modulation based on GMSK with 8-PSK modulation, which doubles normal bits rates and triples peak bit rates. Embodiments of the present invention employ known components of the EDGE signal to obtain pseudoranges for position location. These components are similar to the components described above for the GSM signal.

Alternate Embodiments

The invention can be implemented in digital electronic circuitry, or in computer hardware, firmware, software, or in combinations thereof. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of embodiments of the invention have been described. Nevertheless, it will be understood that various modifications may be made without departing from the spirit and scope of the invention.

For example, while various signals and signal processing techniques are discussed herein in analog form, digital implementations will be apparent to one skilled in the relevant art after reading this description.

In some implementations, Location server 110 employs redundant signals e at the system level, such as pseudoranges available from the TV transmitters, additional checks to validate each TV channel and pseudo-range, and to identify TV that are erroneous. One such technique is conventional receiver autonomous monitoring (RAIM).

Accordingly, other embodiments are within the scope of the following claims.

What is claimed is:

1. A method for determining the position of a user terminal, comprising:

receiving at the user terminal a broadcast television signal from a television signal transmitter; and receiving at the user terminal a mobile telephone signal from a mobile telephone base station;

wherein the position of the user terminal is determined based on the broadcast television signal, the mobile telephone signal, a location of the television signal transmitter, and a location of the mobile telephone base station; and wherein the mobile telephone signal is selected from the group consisting of a EDGE (Enhanced Data Rates for Global System for Mobile Communications (GSM) Evolution) signal;

a Code-Division Multiple Access 2000 (cdma2000) signal; and a Wideband Code-Division Multiple Access (WCDMA) signal.

2. The method of claim 1, further comprising:

determining the position of the user terminal based on the broadcast television signal, the mobile telephone signal, the location of the television signal transmitter, and the location of the mobile telephone base station.

3. The method of claim 1:

wherein the mobile telephone signal comprises a timing advance parameter; and wherein the position of the user terminal is determined based on the broadcast television signal, the timing advance parameter, the location of the television signal transmitter, and the location of the mobile telephone base station.

4. The method of claim 3, further comprising:

determining the position of the user terminal based on the broadcast television signal, the timing advance parameter, the location of the television signal transmitter, and the location of the mobile telephone base station.

5. An apparatus for determining the position of a user terminal, comprising:

a first receiver to receive at the user terminal a broadcast television signal from a television signal transmitter; and a second receiver to receive at the user terminal a mobile telephone signal from a mobile telephone base station;

wherein the position of the user terminal is determined based on the broadcast television signal, the mobile telephone signal, a location of the television signal transmitter, and a location of the mobile telephone base station; and wherein the mobile telephone signal is selected from the group consisting of a EDGE (Enhanced Data Rates for Global System for Mobile Communications (GSM) Evolution) signal;

a Code-Division Multiple Access 2000 (cdma2000) signal; and a Wideband Code-Division Multiple Access (WCDMA) signal.

6. The apparatus of claim 5, further comprising:

a processor to determine the position of the user terminal based on the broadcast television signal, the mobile telephone signal, the location of the television signal transmitter, and the location of the mobile telephone base station.

7. The apparatus of claim 5:

wherein the mobile telephone signal comprises a timing advance parameter; and wherein the position of the user terminal is determined based on the broadcast television signal, the timing advance parameter, the location of the television signal transmitter, and the location of the mobile telephone base station.

8. The apparatus of claim 7, further comprising:

a processor to determine the position of the user terminal based on the broadcast television signal, the timing advance parameter, the location of the television signal transmitter, and the location of the mobile telephone base station.

9. An apparatus for determining the position of a user terminal, comprising:

first receiver means for receiving at the user terminal a broadcast television signal from a television signal transmitter; and second receiver means for receiving at the user terminal a mobile telephone signal from a mobile telephone base station;

wherein a position of the user terminal is determined based on the broadcast television signal, the mobile telephone signal, a location of the television signal transmitter, and a location of the mobile telephone base station; and wherein the mobile telephone signal is selected from the group consisting of a EDGE (Enhanced Data Rates for Global System for Mobile Communications (GSM) Evolution) signal;

a Code-Division Multiple Access 2000 (cdma2000) signal; and a Wideband Code-Division Multiple Access (WCDMA) signal.

10. The apparatus of claim 9, further comprising:

processor means for determining the position of the user terminal based on the broadcast television signal, the mobile telephone signal, the location of the television signal transmitter, and the location of the mobile telephone base station.

11. The apparatus of claim 9:

wherein the mobile telephone signal comprises a timing advance parameter; and wherein the position of the user terminal is determined based on the broadcast television signal, the timing advance parameter, the location of the television signal transmitter, and the location of the mobile telephone base station.

12. The apparatus of claim 11, further comprising:

processor means for determining the position of the user terminal based on the broadcast television signal, the timing advance parameter, the location of the television signal transmitter, and the location of the mobile telephone base station.

* * * * *